United States Patent
Doyle et al.

(10) Patent No.: US 9,632,755 B1
(45) Date of Patent: Apr. 25, 2017

(54) INTERFACE METHOD RESOLUTION IN OBJECT ORIENTED PROGRAMMING MODELS

(71) Applicant: International Business Machines Corporation, Armonk, NY (US)

(72) Inventors: Patrick R. Doyle, Toronto (CA); Daniel J. Heidinga, Ottawa (CA); Bjoern Vaardal, Richmond (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/876,065

(22) Filed: Oct. 6, 2015

(51) Int. Cl.
G06F 9/44 (2006.01)
G06F 17/30 (2006.01)
G06F 9/455 (2006.01)

(52) U.S. Cl.
CPC .............. *G06F 8/315* (2013.01); *G06F 8/35* (2013.01); *G06F 8/38* (2013.01); *G06F 9/4552* (2013.01); *G06F 17/3048* (2013.01)

(58) Field of Classification Search
CPC ...................................................... G06F 8/315
USPC .......................................................... 717/120
See application file for complete search history.

(56) References Cited

U.S. PATENT DOCUMENTS

| | | | |
|---|---|---|---|
| 6,260,045 B1 * | 7/2001 | Eidt | G06F 9/443 |
| 6,651,248 B1 * | 11/2003 | Alpern | G06F 9/443 |
| | | | 712/E9.084 |
| 6,862,728 B2 | 3/2005 | Darnell et al. | |
| 7,007,005 B2 | 2/2006 | Rautenback et al. | |

(Continued)

OTHER PUBLICATIONS

Alpern et al., "Efficient Implementation of Java Interfaces: Invokeinterface Considered Harmless", IBM T.J. Watson Research Center, P.O. Box 704, Yorktown Heights, NY 10598, OOPSLA 01, Tampa Florida USA, Copyright ACM 2001,1-58113-335-9/01/10, pp. 108-124, <http://www.research.ibm.com/people/d/dgrove/papers/oopsla01.pdf >.

(Continued)

*Primary Examiner* — Wei Zhen
*Assistant Examiner* — Lanny Ung
(74) *Attorney, Agent, or Firm* — Steven L. Fisher-Stawinski; David B. Woycechowsky

(57) ABSTRACT

A computer-implemented method includes receiving an invocation of an invoked interface associated with a class, identifying, based on the class, a plurality of interface lookup artifacts and a cached interface lookup artifact, and comparing the invoked interface with a cache interface. The cache interface is associated with the cached interface artifact. The computer-implemented method further includes, responsive to the invoked interface matching the cache interface, returning the cached interface artifact, and responsive to the invoked interface not matching the cache interface, searching the plurality of interface lookup artifacts until finding a matching interface lookup artifact. The matching interface lookup artifact is associated with a matching interface that matches the invoked interface. Responsive to finding the matching interface lookup artifact, returning the matching interface lookup artifact and updating the cached interface lookup artifact to the matching interface lookup artifact. A corresponding computer program product and computer system are also disclosed.

18 Claims, 6 Drawing Sheets

(56) References Cited

U.S. PATENT DOCUMENTS

| | | |
|---|---|---|
| 7,478,409 B2 | 1/2009 | Scian et al. |
| 7,925,640 B2 | 4/2011 | Mathiske et al. |
| 8,793,671 B2 | 7/2014 | Stall et al. |

OTHER PUBLICATIONS

Cunei et al., "An efficient and flexible toolkit for composing customized method dispatchers", Abstract, Article first published online: May 29, 2007, DOI: 10.1002/spe.821, 2 pages, <http://dl.acm.org/citation.cfm?id=1330391.1330393&coll=DL&dl=GUIDE&CFID=537807164&CFTOKEN=94931348>.

Venners, Bill, "Under the Hood—How the Java virtual machine handles method invocation and return", Jun. 1, 1997, JavaWorld (p. 1 of 2), 1 print page, Copyright © 1994-2015 JavaWorld, Inc., <http://www.javaworld.com/article/2076949/learn- java/how-the-java-virtual-machine-handles-method-invocation-and-return.html>.

Venners, Bill, "Under the Hood—How the Java virtual machine handles method invocation and return", Jun. 1, 1997, JavaWorld (p. 2 of 2), 8 print pages, Copyright © 1994-2015 JavaWorld, Inc., <http://www.javaworld.com/article/2076949/learn-java/how-the-java-virtual-machine-handles-method-invocation-and-return.html?page=2>.

IBM®, "IBM SDK, Java Technology Edition, Version 8", modified date Mar. 6, 2015, 3 pages, printed on Aug. 18, 2015, <http://www-01.ibm.com/support/docview.wss?uid=swg21696670>, Evidence of Grace Period Use/Sale.

IBM®, "IBM SDK, Java Technology Edition, Version 8: Current news", initial release date Feb. 2015, 3 pages, printed on Aug. 18, 2015, <http://www-01.ibm.com/support/docview.wss?uid=swg21672834>, Evidence of Grace Period Use/Sale.

IBM®, "IBM SDK , JAVA Technology Edition, Version 8: Beta Program, Latest news and Information", beta 5 release, Dec. 2014, 5 pages, printed on Oct. 1, 2015, <https://www.ibm.com/developerworks/community/files/form/anonymous/api/library/16569f7e-e56f-495b-9214-40974da293e0/document/8372c3b0-1b48-4690-be46-fcb380870727/version/7f3d37db-3e41-4739-843e-593912f53499/media/java8%20beta%205%20news%20technote.html>, Evidence of Grace Period Use/Sale.

"What is the point of invokeinterface?", Stack Overflow, printed on Sep. 2, 2015, 4 pages <http://stackoverflow.com/questions/1504633/what-is-the-point-of-invokeinterface>.

\* cited by examiner

```
ITable findITable(Class receiverClass, Interface interfaceClass) {

/* cache check*/
    set iTable to receiverClass.lastUsedITable;
    if iTable is not null {
        if iTable.interface is equal to interfaceClass {
            return iTable;
        }
    }

/*Linear search*/
    set iTable to receiverClass.iTable;
    while iTable is not null {
        if iTable.interface is equal to inerfaceClass {
            receiverClass.lastUsedITable = iTable;
            return iTable;
        }
        iTable = iTable.next;
    }
}
```

FIG. 4

```
ITable findITable(Class receiverClass, Interface interfaceClass) {

/* cache check - lastUsedITable has been initialized*/
    set iTable to receiverClass.lastUsedITable;
    if iTable.interface is equal to interfaceClass {
        return iTable;
    }

/*Linear search*/
    set iTable to receiverClass.iTable;
    while iTable is not null {
        if iTable.interface is equal to inerfaceClass {
            receiverClass.lastUsedITable = iTable;
            return iTable;
        }
        iTable = iTable.next;
    }
}
```

FIG. 5

INTERFACE METHOD RESOLUTION IN OBJECT ORIENTED PROGRAMMING MODELS

BACKGROUND

The present invention relates generally to the field of object oriented programming models, and more particularly to the implementation of interface method resolution in object oriented programming models.

In object oriented programming (OOP) models, interface (also known as protocols) provide a mechanism for multiple inheritance of specification, but not implementation. This provides a common means for unrelated objects to communicate with one another. Interfaces are explicitly implemented in a variety of OOP models such as Java, C#, and Objective-C. In various OOP implementations, interfaces may be implemented by virtual method pointers, which relate the interface method names to their corresponding implementations in each class.

It is well-known by software engineers working in Java and related models that the required search step for interfaces is time-costly as compared with strictly class-based solutions such that interfaces continue to be disfavored.

SUMMARY

A computer-implemented method includes receiving an invocation of an invoked interface associated with a class, identifying, based on the class, a plurality of interface lookup artefacts and a cached interface lookup artefact, and comparing the invoked interface with a cache interface. The cache interface is associated with the cached interface artefact. The computer-implemented method further includes, responsive to the invoked interface matching the cache interface, returning the cached interface artefact, and responsive to the invoked interface not matching the cache interface, searching the plurality of interface lookup artefacts until finding a matching interface lookup artefact. The matching interface lookup artefact is associated with a matching interface that matches the invoked interface. Responsive to finding the matching interface lookup artefact, returning the matching interface lookup artefact and updating the cached interface lookup artefact to the matching interface lookup artefact. A corresponding computer program product and computer system are also disclosed.

BRIEF DESCRIPTION OF THE DRAWINGS

FIG. 4 displays a section of Java-like pseudocode suitable for performing an ITable cache program with cached ITable validation, in accordance with an embodiment of the present invention.

FIG. 5 displays a section of Java-like pseudocode suitable for performing an ITable cache program with cached ITable initialization, in accordance with an embodiment of the present invention.

DETAILED DESCRIPTION

Figure 1:
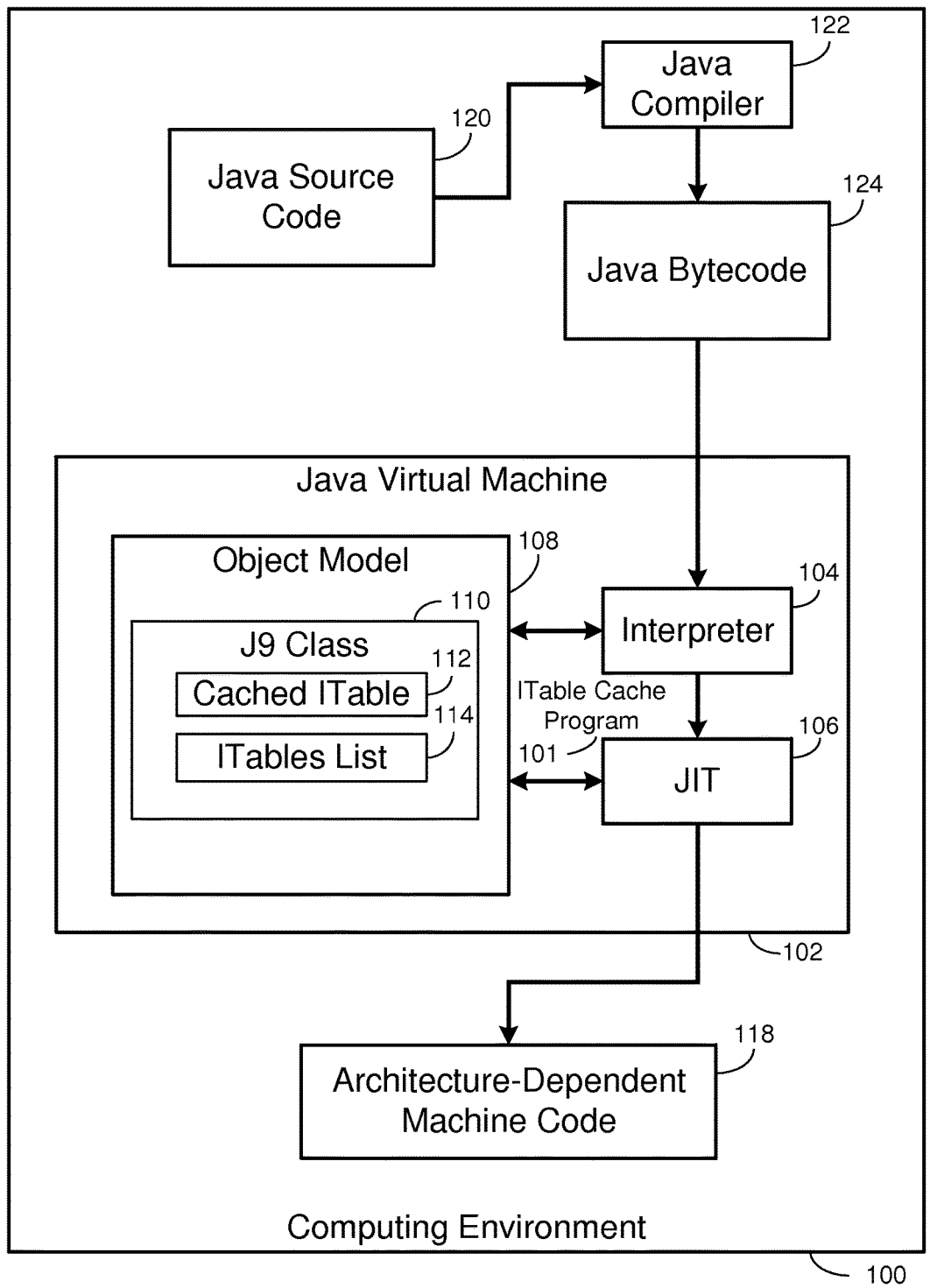
FIG. 1 is a functional block diagram depicting a computing environment suitable for performing an ITable cache program, in accordance with at least one embodiment of the present invention.

In Java and Java-like OOP models, such as C#, each class that implements one or more interfaces tracks the mapping of the interface methods to virtual methods on a per class basis. This mapping may be stored in an interface table (ITable) for each interface that a class implements. For each class, a linked list of ITables may be maintained, whereby any invocation of an interface via a class object requires searching the linked list of ITables of the class for the ITable that matches the interface that defines the method invoked (in Java, interfaces are invoked via the invokeinterface instruction, as well as the instanceof and checkcast instructions, when passed an interface type). More generally, the ITable may be understood as an interface lookup artefact, which may include alternative implementations of interfaces as defined in the relevant specifications for Java or another OOP model. Examples include other linear data structures such as arrays as well as hierarchical data structures, such as trees, heaps, etc.

In general, implementations of interfaces and interface-like constructs in Java and Java-like OOP models require some type of lookup of the correct implementation at run-time, as a feature of implemented polymorphism. Put another way, identifying the correct implementation of interface methods cannot be done until run-time, which requires that the interface lookup artefacts be fully searched, whether linearly as in a linked list for Java (in particular the IBM J9 implementation) or non-linearly as in a hierarchical or other data structure. For any implementation, searching requires examining all nodes, which is known to be slow. This property of interfaces is an inherent inefficiency of polymorphism in Java that has been recognized since the introduction of Java in the mid-1990s.

Various attempts have been made over the years to improve the performance of Java interfaces. One known solution, termed Interface Method Table (IMT), includes hashing interface signatures to a table with a fixed number of slots, with custom-generated stubs that handle conflict resolution resulting from hash collisions. Despite theoretical performance improvements, IMT has a large footprint requirement and is not considered workable in many production environments.

Another known technique is the Polymorphic Inline Cache (PIC). The insight of PIC is that potentially polymorphic types tend to be monomorphic as to a given call site (a function or method call in the code), even if the specific type cannot be determined until runtime. In PIC, each call site is allotted a number of cache slots, which begin, at runtime uninitialized. As the call site is processed, the cache slots may be filled with the correct classes/tables/methods/interfaces, and the runtime interpreter can check the cache slots each time the call site comes up.

The inventors of the present invention have identified that, in addition to the call-site based monomorphism, there is a "stickiness" or "weak monomorphism" associated with interface invocations via a given class—most consecutive calls to an interface via a given class are for the same interface. The inventors concluded that a performance enhancement may be obtained by storing the most recently used interface's ITable. In particular, the bytecode instructions instanceof and checkcast, when passed an interface type, were identified as good predictors that the relevant ITable was about to be used consecutively, making the cached ITable likely advantageous if updated at that point. One possible implementation would include re-ordering the ITable linked list so that the most recently used ITable appears first, however this would result in an invalid linked list because the ITable linked lists are, in J9 and other implementations, suffix shared between subclasses and superclasses (see FIG. 2). Additionally, re-ordering requires overhead as the ITable linked list must be read or modified.

By contrast, the solution of the present invention involves caching the most recently used ITable, at a class level, but leaves the ITable linked list unmodified. PIC provides a cache as to a given call site, but does not capture all cases of invokeinterface, as well as cases of instanceof or checkcast being passed an interface type. The present invention provides an ITable cache program 101 that caches the last used interface as to a given class, regardless of call site. Thus, the present invention and PIC represent different cache-related concepts and may be used complementarily in the same system with combined benefits. Possible advantages of various embodiments of the present invention, as compared with the other techniques described, include: (1) avoiding, in the common case a linear search of the ITables linked list; (2) applying the "stickiness" or "weak monomorphism" of interface dispatches; (3) being simple to implement; (4) enhancing performance particularly in the case where the ITable linked list is long and the targeted interface appears late in the chain; and (5) having a low memory footprint, requiring only an additional word per class. It should be noted any particular embodiment of the invention may enjoy some, all, or none, of the aforementioned advantages, and the recitation of such possible advantages is not intended as a limitation on the scope of the invention as described and claimed herein.

The inventors have demonstrated a performance enhancement on an experimental Java Virtual Machine (JVM) that already employs PIC, both with and without the present invention implemented. In a micro-benchmark test, an ITable linked list of ten interfaces was created and an invokeinterface using the last ITable was called. This test showed an 11% improvement. In a more realistic type test, the inventors ran the startup process for IBM Liberty Profile forty times on each version of the experimental JVM. The result showed a 2.32% decrease in average startup time and a 0.10% increase in average memory footprint.

FIG. 1 depicts an example computing environment 100 suitable for performing an ITable cache program 101 in accordance with at least one embodiment of the present invention. The computing environment 100 includes a JVM 102. Java source code 120 is compiled by a Java compiler 122 into Java bytecode 124. Compilation need not occur in real-time and need not occur within the same environment as the JVM 102.

Within the JVM 102, the interpreter 104 and the just-in-time compiler (JIT) 106 process Java bytecode 124 together, with the JIT 106 supporting the interpreter 104 by producing architecture dependent machine code 118 in real time. In IBM J9 and similar implementations, the object model 108 is represented in memory by a collection of data structures including J9 classes 110. Each J9 class 110 includes in its data structure an ITables list 114, which is a linked list of ITables, one for each interface implemented by the particular J9 class. The ITable cache program 101 may implemented through the behavior of both the Interpreter 104 and the JIT, or exclusively in one or the other. This is made possible because the object model 108 is accessible to both the Interpreter 104 and the JIT 106.

Equivalently, another OOP model may be substituted, for example C#. In fully compiled models such as C++ or Objective C, the virtual machine may be dispensed with entirely in favor of a purely compiled program, with the ITable cache program 101 implemented in compiled functions. In still other embodiments, the ITable cache program 101 may be implemented in hardware, for example in a hardware Java processor.

Figure 2:
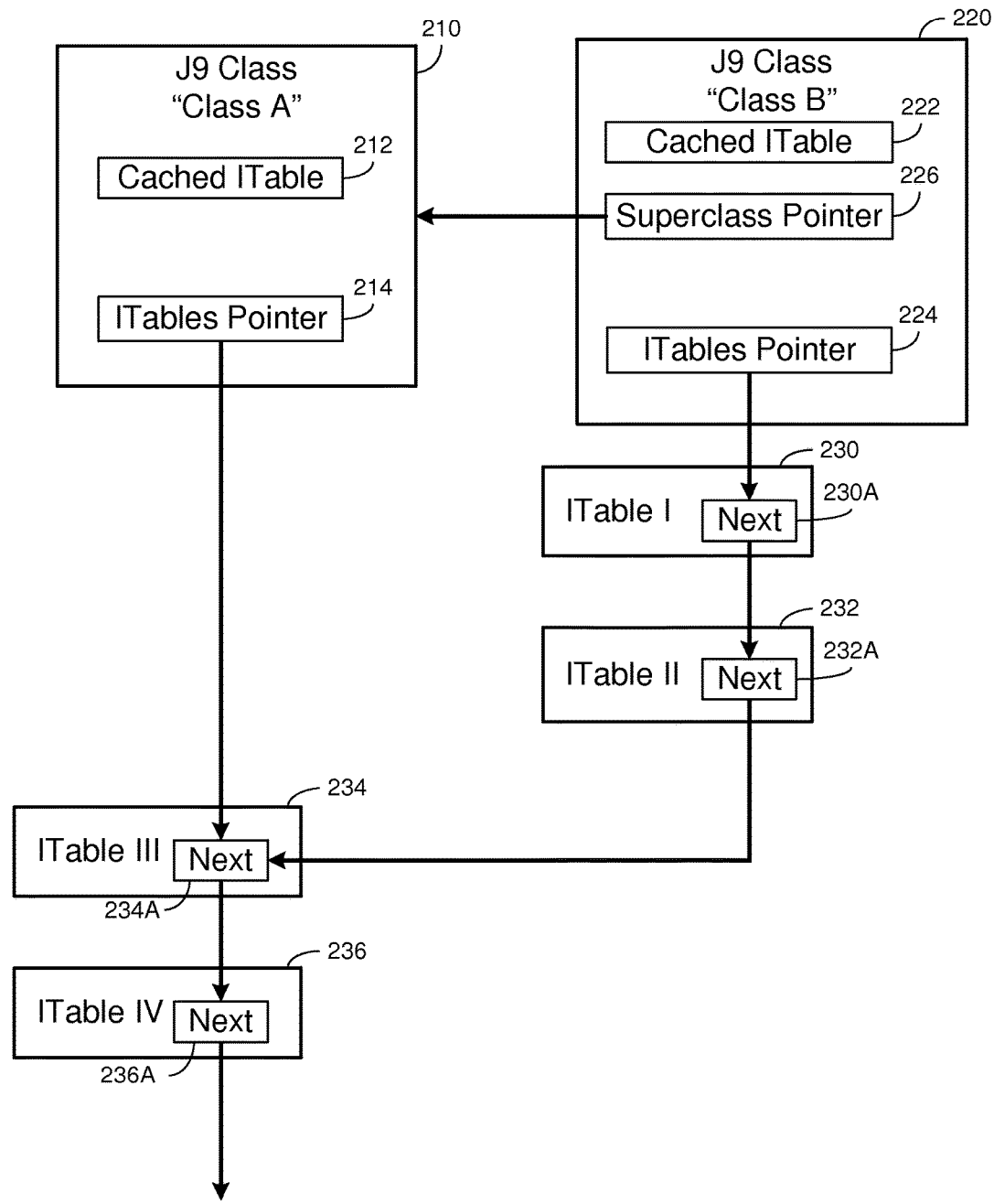
FIG. 2 is a block diagram depicting an exemplary ITable linked list, in accordance with at least one embodiment of the present invention.

In general, the plurality of interface lookup artefacts (ITables) may be organized as a linked list of ITables, and searching the plurality of interface lookup artefacts includes linearly traversing (walking) the linked list. FIG. 2 depicts an exemplary linked list of ITables for two J9 classes, Class A 210 and Class B 220. Class A 210 includes a cached ITable 212, and Class B has a cached ITable 222, in accordance with at least one embodiment of the present invention. Further, Class B 220 is a subclass of Class A 210; equivalently, Class A 210 is a superclass of Class B 220. The superclass/subclass relationship is defined by a superclass pointer 226, which is defined for Class B 220, but not for Class A 210. If Class A had a superclass of its own, then it would define a superclass pointer accordingly.

Referring still to FIG. 2, both Class A 210 and Class B 220 implement a number of interfaces, as depicted by ITables I-IV 230-236. Class B 220, being a subclass of Class A 210, inherits Class A 210's implementations of those interfaces that Class A 210 implements but Class B does not override. Class B 220 also implements some interfaces on its own and/or overrides one or more interfaces implemented by Class A 210. Each J9 class is associated to the correct ITable for its own implementation of each interface by its own ITables pointer 214 and 224 for Class A 210 and Class B 220, respectively. Class B 210's ITables pointer 224 points to ITable I 230, whose Next 230A points to ITable II 232. In the depicted example, ITable II 232 represents the last interface implementation unique to Class B 220 not inherited from Class A 210. Thus, ITable II 232's Next 232A points to ITable III 234, as does Class A 210's ITables pointer 214. From ITable III 234, all ITables of the linked list are common to Class A 210 and Class B 220, and thus ITable III 234's Next points to ITable IV 236, and ITable IV 236's Next points to 236A, and so on until the end of the linked list.

Figure 3:
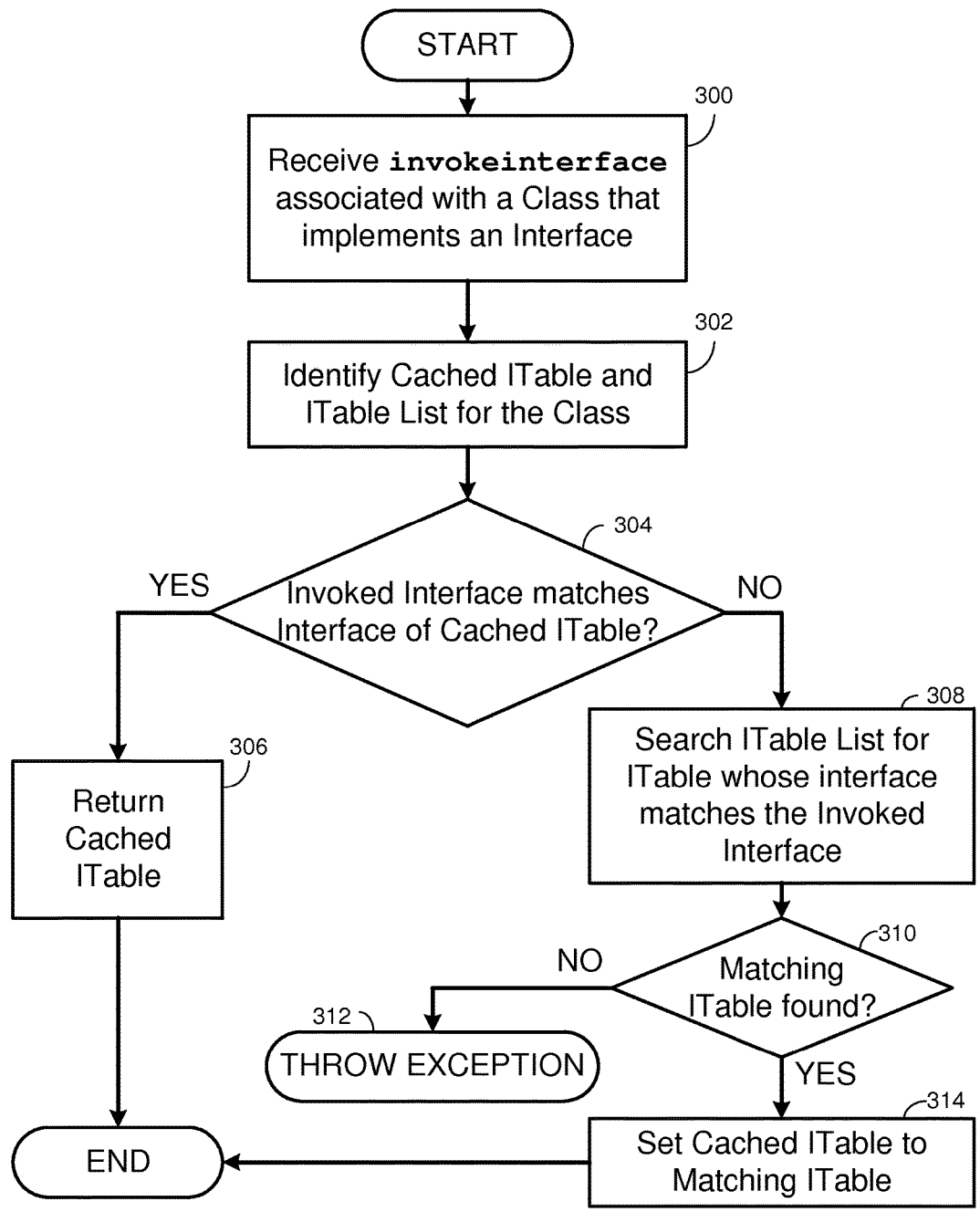
FIG. 3 is a flowchart diagram illustrates operational steps of an ITable cache program, in accordance with an embodiment of the present invention.

FIG. 3 displays a flowchart diagram for an ITable cache program 101 in accordance with at least one embodiment of the present invention. At step 300, the ITable cache program 101 includes receiving an invocation of an invoked interface associated with a class. In Java terms, step 300 may be understood as an invokeinterface instruction to the JVM, which, in Java, would necessarily be with respect to or in the context of a particular class. The ITable cache program may also be executed incidentally to other bytecode instructions, specifically instanceof and checkcast, where those instructions are passed an interface type (i.e. called from an object and passed an interface as an argument to be tested against the object). Thus, step 300, receiving an invocation of an invoked interface associated with a class may be understood as including receiving a bytecode instruction with the bytecode instruction being passed an interface type (for invokeinterface, the interface is explicitly the one invoked; for instanceof and checkcast, the interface is the test argument), and the bytecode instruction being selected from the group consisting of: (a) invokeinterface; (b) instanceof; and (c) checkcast. In the context of particular implementations of Java, the class is the J9 class 110. More generally, step 300 may be performed in any OOP model via an instruction, step, or code statement that identifies both an interface and a class (or conceptually similar OOP constructs).

A step 302, the ITable cache program 101 identifies, based on the class, a plurality of interface lookup artefacts and a cached interface lookup artefact. In the context of particular implementations of Java, the plurality of interface lookup artefacts is the ITables List 114 and the cached ITable 112. The identification step, more specifically, may be performed as a lookup of the properties of the class.

Referring still to the flowchart of FIG. 3, at decision block 304, the ITable cache program 101 compares the invoked interface with a cache interface. The cache interface is associated with the cached interface artefact. More particularly, the cached interface artefact may be understood to represent an implementation of some interface, labeled the cache interface. In particular implementations of Java, each interface is represented in memory uniquely. Accordingly, the invoked interface may be understood to match any other interface is the invoked interface and the other interface have identical pointers; that is, a pointer to the invoked interface and a pointer to the other interface point to the same memory location.

Responsive to the invoked interface matching the cache interface (the YES branch of decision block 304), the ITable cache program 101 returns the cached interface artefact at step 306. Conceptually, the case of step 306 may be understood as a successful hit on the cached ITable 112, and the JVM may then look up the correct implementation of the method called by invokeinterface and proceed.

Responsive to the invoked interface not matching the cached interface (the NO branch of decision block 304), the ITable cache program proceeds at step 308 by searching the plurality of interface lookup artefacts until finding a matching interface lookup artefact. The matching interface lookup artefact is associated with a matching interface that catches the invoked interface. In the context of particular java implementations, the plurality of interface lookup artefacts is organized as a linked list of ITables, and searching the plurality of interface lookup artefacts comprises linearly traversing the linked list. Conceptually, the case of step 308 may be understood as a non-hit on the cached ITable 112, which triggers the slow walking of the ITables list 114; step 308 is sought to be avoided by use of the cached ITable 112.

In the course of searching the plurality of interface lookup artefacts, the ITable cache program 101 may find a matching interface lookup artefact, or not. At decision block 310, if the matching interface lookup artefact is not found (NO branch), then the ITable cache program may infer an error condition. Specifically, the inferred error condition is that the invoked interface is not implemented by the designated class. In Java and Java-like contexts, the ITable cache program 101 may, at terminator 312, throw and exception or otherwise handle the error condition.

In the non-error case, a matching interface lookup artefact is found. Responsive to finding the matching interface lookup artefact, the ITable cache program returns, at step 314, the matching interface lookup artefact and updates the cached interface lookup artefact to the matching interface lookup artefact. In the context of particular Java implementations, the cached ITable for the class that implements the invoked interface is set to the ITable for the invoked interface, which was found by walking the linked list of ITables for the class that implements the invoked interface. After the ITable cache program 101 returns the matching ITable, the JVM may look up the correct implementation of the method called by invokeinterface and proceed. Subsequent calls to the same implementation of a method of the invoked interface will become hits on the cached ITable 112.

FIG. 4 displays a Java-like pseudocode for an ITable cache program 101, in accordance with an embodiment of the present invention. In the pseudocode, the first block of pseudocode provides for a cache check where the cached ITable (receiverClass.lastUsedTable) has been lazily initialized to a null value. More generally, the ITable cache program 101 may be understood to initialize the cached interface lookup artefact to a null value. In the pseudocode of FIG. 4, the cache check is shown wrapped in a test iTable is not null. In the depicted case, decision block 304, comparing the invoked interface with the cache interface may be understood to include testing whether the cached interface lookup artefact is equal to the null value. This prevents an exception condition whereby the comparison step is not possible due to the cached ITable being null. The second block of pseudocode of FIG. 4 depicts a linear search of the ITable linked list by traversing iTable.next.

Additional efficiency over the cached ITable 112 may be gained by eliminating the validation step of testing for null equality. FIG. 5 depicts a pseudocode where the validation step is safely omitted because the cached ITable 112 has been initialized. Specifically, the ITable cache program 101 may, responsive to the plurality of interface lookup artefacts being of at least of size one (that is, including at least one ITable or interface lookup artefact or, equivalently, the class implementing at least one interface), initialize the cached lookup artefact to the first interface lookup artefact of the plurality of interface lookup artefacts. In the context of particular implementations of Java, the cached ITable 112 for a given J9 class 110 may be initialized to the first ITable of the ITables list 114. If the J9 class 110 implements no interfaces, then the cached ITable 112 may be initialized to a dummy ITable (an ITable that compares with, but is not equal to, any ITable for a real interface) to avoid a null comparison. Thus, responsive to the plurality of interface lookup artefacts being of size zero (the class implements no interfaces), the ITable cache program 101 may initialize the cached lookup artefact to a dummy lookup artefact. In the depicted case, decision block 304, comparing the invoked interface with the cache interface may be understood to not include validating the cached interface lookup artefact.

Figure 6:
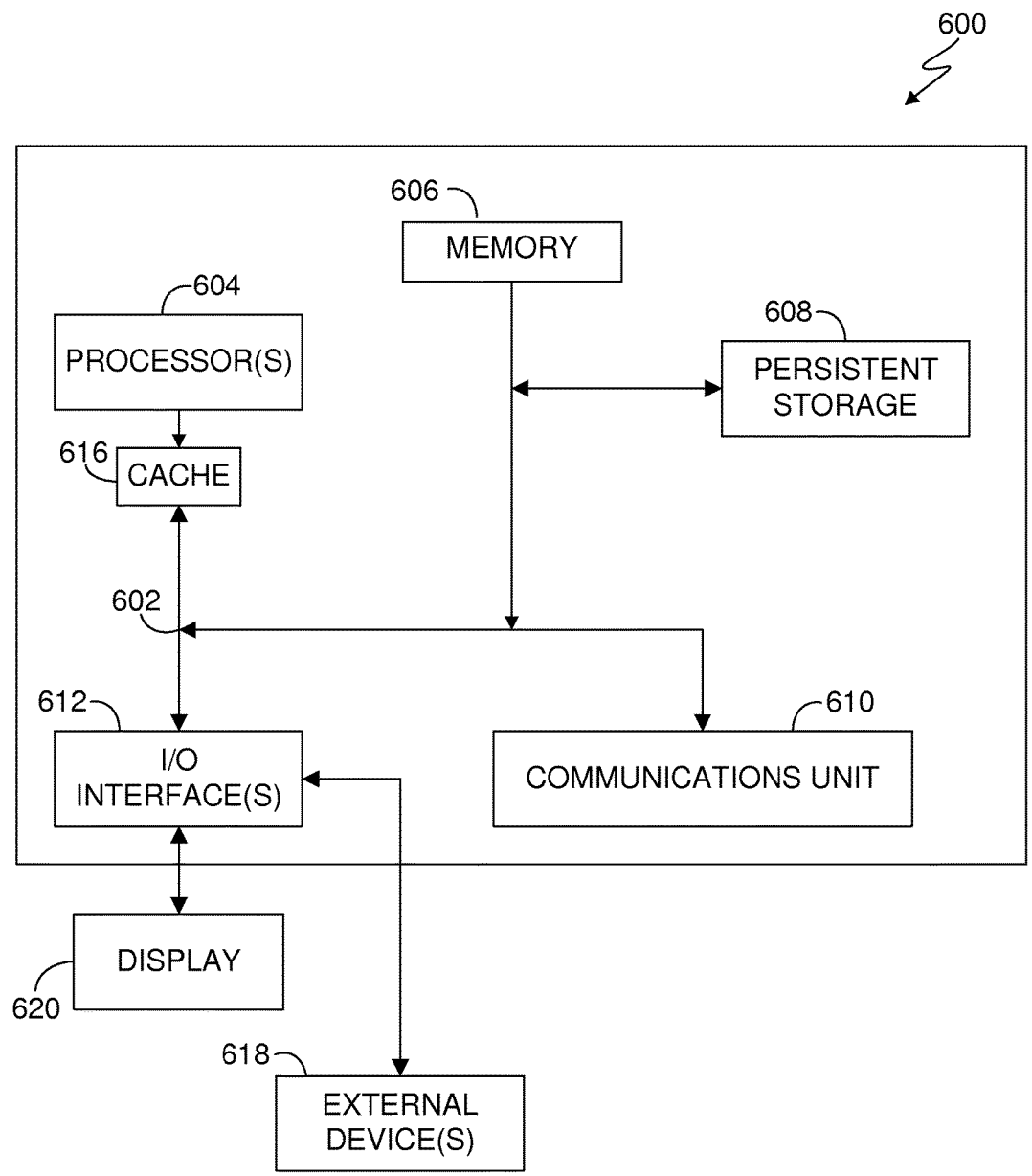
FIG. 6 is a block diagram of various logical components of a computer system suitable for performing an ITable cache program, in accordance with at least one embodiment of the invention.

FIG. 6 is a block diagram depicting components of a computer 600 suitable for executing the ITable cache program 101. FIG. 6 displays the computer 600, the one or more processor(s) 604 (including one or more computer processors), the communications fabric 602, the memory 606, the RAM, the cache 616, the persistent storage 608, the communications unit 610, the I/O interfaces 612, the display 620, and the external devices 618. It should be appreciated that FIG. 6 provides only an illustration of one embodiment and does not imply any limitations with regard to the environments in which different embodiments may be implemented. Many modifications to the depicted environment may be made.

As depicted, the computer 600 operates over a communications fabric 602, which provides communications between the cache 616, the computer processor(s) 604, the memory 606, the persistent storage 608, the communications unit 610, and the input/output (I/O) interface(s) 612. The communications fabric 602 may be implemented with any architecture suitable for passing data and/or control information between the processors 604 (e.g. microprocessors, communications processors, and network processors, etc.), the memory 606, the external devices 618, and any other hardware components within a system. For example, the communications fabric 602 may be implemented with one or more buses or a crossbar switch.

The memory 606 and persistent storage 608 are computer readable storage media. In the depicted embodiment, the memory 606 includes a random access memory (RAM). In general, the memory 606 may include any suitable volatile or non-volatile implementations of one or more computer readable storage media. The cache 616 is a fast memory that enhances the performance of computer processor(s) 604 by holding recently accessed data, and data near accessed data, from memory 606.

Program instructions for the ITable cache program 101 may be stored in the persistent storage 608 or in memory 606, or more generally, any computer readable storage media, for execution by one or more of the respective computer processors 604 via the cache 616. The persistent storage 608 may include a magnetic hard disk drive. Alternatively, or in addition to a magnetic hard disk drive, the persistent storage 608 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of the persistent storage 608.

The communications unit 610, in these examples, provides for communications with other data processing systems or devices. In these examples, the communications unit 610 may include one or more network interface cards. The communications unit 610 may provide communications through the use of either or both physical and wireless communications links. The ITable cache program 101 may be downloaded to the persistent storage 608 through the communications unit 610. In the context of some embodiments of the present invention, the source of the various input data may be physically remote to the computer 600 such that the input data may be received and the output similarly transmitted via the communications unit 610.

The I/O interface(s) 612 allows for input and output of data with other devices that may operate in conjunction with the computer 600. For example, the I/O interface 612 may provide a connection to the external devices 618, which may include a keyboard, keypad, a touch screen, and/or some other suitable input devices. External devices 618 may also include portable computer readable storage media, for example, thumb drives, portable optical or magnetic disks, and memory cards. Software and data used to practice embodiments of the present invention may be stored on such portable computer readable storage media and may be loaded onto the persistent storage 608 via the I/O interface(s) 612. The I/O interface(s) 612 may similarly connect to a display 620. The display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving an invocation of an invoked interface associated with a class;
   identifying, based on said class, a plurality of interface lookup artefacts and a cached interface lookup artefact;
   comparing said invoked interface with a cache interface, said cache interface being associated with said cached interface artefact;
   responsive to said invoked interface matching said cache interface, returning said cached interface artefact;
   responsive to said invoked interface not matching said cache interface:
     searching said plurality of interface lookup artefacts until finding a matching interface lookup artefact, said matching interface lookup artefact being associated with a matching interface that matches said invoked interface, and
     responsive to finding said matching interface lookup artefact, returning said matching interface lookup artefact and updating said cached interface lookup artefact to said matching interface lookup artefact, and
   initializing said cached interface lookup artefact to a null value wherein comparing said invoked interface with a cache interface comprises testing whether said cached interface lookup artefact is equal to said null value.

2. The computer-implemented method of claim 1, further comprising:
   responsive to said plurality of interface lookup artefacts being at least of size one, initializing said cached interface lookup artefact to a first interface lookup artefact of said plurality of interface lookup artefacts; and
   responsive to said plurality of interface lookup artefacts being of size zero, initializing said cached interface lookup artefact to a dummy lookup artefact wherein comparing said invoked interface with a cache interface comprises not validating said cached interface lookup artefact.

3. The computer-implemented method of claim 1, wherein:
   said plurality of interface lookup artefacts is organized as a linked list; and
   searching said plurality of interface lookup artefacts comprises linearly traversing said linked list.

4. The computer-implemented method of claim 1, wherein said invoked interface matches any other interface if said invoked interface and said other interface have identical pointers.

5. The computer-implemented method of claim 1, wherein each of said plurality of interface lookup artefacts is an interface table.

6. The computer-implemented method of claim 1, wherein receiving an invocation of an invoked interface associated with a class comprises receiving a bytecode instruction, said byte code instruction being passed an interface type, and said bytecode instruction being selected from the group consisting of:
   (a) invokeinterface;
   (b) instanceof; and
   (c) checkcast.

7. A computer program product, the computer program product comprising one or more computer readable storage media and program instructions stored on said one or more computer readable storage media, said program instructions comprising instructions to:
   receive an invocation of an invoked interface associated with a class;
   identify, based on said class, a plurality of interface lookup artefacts and a cached interface lookup artefact;

compare said invoked interface with a cache interface, said cache interface being associated with said cached interface artefact;

responsive to said invoked interface matching said cache interface, return said cached interface artefact;

responsive to said invoked interface not matching said cache interface:
  search said plurality of interface lookup artefacts until finding a matching interface lookup artefact, said matching interface lookup artefact being associated with a matching interface that matches said invoked interface, and
  responsive to finding said matching interface lookup artefact, return said matching interface lookup artefact and update said cached interface lookup artefact to said matching interface lookup artefact, and initialize said cached interface lookup artefact to a null value wherein said instructions to compare said invoked interface with a cache interface comprise testing whether said cached interface lookup artefact is said null value.

8. The computer program product of claim 7, wherein said program instructions further comprise instructions to:
  responsive to said plurality of interface lookup artefacts being at least of size one, initialize said cached interface lookup artefact to a first interface lookup artefact of said plurality of interface lookup artefacts; and
  responsive to said plurality of interface lookup artefacts being of size zero, initialize said cached interface lookup artefact to a dummy lookup artefact wherein said instructions to compare said invoked interface with a cache interface do not comprise instructions to validate said cached interface lookup artefact.

9. The computer program product of claim 7, wherein:
  said plurality of interface lookup artefacts is organized as a linked list; and
  said instructions to search said plurality of interface lookup artefacts comprise instructions to linearly traverse said linked list.

10. The computer program product of claim 7, wherein said invoked interface matches any other interface if said invoked interface and said other interface have identical pointers.

11. The computer program product of claim 7, wherein each of said plurality of interface lookup artefacts is an interface table.

12. The computer program product of claim 7, wherein said instructions to receive an invocation of an invoked interface associated with a class comprise instructions to:
  receive a bytecode instruction, said byte code instruction being passed an interface type, and said bytecode instruction being selected from the group consisting of:
    (a) invokeinterface;
    (b) instanceof; and
    (c) checkcast.

13. A computer system, the computer system comprising:
  one or more processors;
  one or more computer readable storage media;
  computer program instructions;
  said computer program instructions being stored on said one or more computer readable storage media;
  said computer program instructions comprising instructions to:
    receive an invocation of an invoked interface associated with a class,
    identify, based on said class, a plurality of interface lookup artefacts and a cached interface lookup artefact,
    compare said invoked interface with a cache interface, said cache interface being associated with said cached interface artefact,
    responsive to said invoked interface matching said cache interface, return said cached interface artefact,
    responsive to said invoked interface not matching said cache interface:
      search said plurality of interface lookup artefacts until finding a matching interface lookup artefact, said matching interface lookup artefact being associated with a matching interface that matches said invoked interface, and
      responsive to finding said matching interface lookup artefact, return said matching interface lookup artefact and update said cached interface lookup artefact to said matching interface lookup artefact, and
    initialize said cached interface lookup artefact to a null value wherein said instructions to compare said invoked interface with a cache interface comprise testing whether said cached interface lookup artefact is said null value.

14. The computer system of claim 13, wherein said program instructions further comprise instructions to:
  responsive to said plurality of interface lookup artefacts being at least of size one, initialize said cached interface lookup artefact to a first interface lookup artefact of said plurality of interface lookup artefacts; and
  responsive to said plurality of interface lookup artefacts being of size zero, initialize said cached interface lookup artefact to a dummy lookup artefact wherein said instructions to compare said invoked interface with a cache interface do not comprise instructions to validate said cached interface lookup artefact.

15. The computer system of claim 13, wherein:
  said plurality of interface lookup artefacts is organized as a linked list; and
  said instructions to search said plurality of interface lookup artefacts comprise instructions to linearly traverse said linked list.

16. The computer system of claim 13, wherein said invoked interface matches any other interface if said invoked interface and said other interface have identical pointers.

17. The computer system of claim 13, wherein each of said plurality of interface lookup artefacts is an interface table.

18. The computer system of claim 13, wherein said instructions to receive an invocation of an invoked interface associated with a class comprise instructions to:
  receive a bytecode instruction, said byte code instruction being passed an interface type, and said bytecode instruction being selected from the group consisting of:
    (a) invokeinterface;
    (b) instanceof; and
    (c) checkcast.

* * * * *